United States Patent
Ali et al.

(10) Patent No.: US 9,622,075 B2
(45) Date of Patent: Apr. 11, 2017

(54) SYSTEM AND METHOD FOR ADAPTIVE MULTIFACTOR AUTHENTICATION

(71) Applicant: Dell Products L.P., Round Rock, TX (US)

(72) Inventors: Raziuddin Ali, Austin, TX (US); Claude Lano Cox, Austin, TX (US); Yuan-Chang Lo, Austin, TX (US); Abu Shaher Sanaullah, Austin, TX (US); Karthikeyan Krishnakumar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 477 days.

(21) Appl. No.: 13/755,256

(22) Filed: Jan. 31, 2013

(65) Prior Publication Data

US 2014/0215559 A1    Jul. 31, 2014

(51) Int. Cl.
*H04W 12/06* (2009.01)
*H04L 29/06* (2006.01)

(52) U.S. Cl.
CPC ............. *H04W 12/06* (2013.01); *H04L 63/18* (2013.01); *H04L 63/0492* (2013.01); *H04L 63/205* (2013.01); *H04L 2463/082* (2013.01)

(58) Field of Classification Search
CPC ......... H04L 63/08; H04L 63/10; H04L 63/20; H04L 63/0428; H04L 29/06
USPC ......... 713/168–174, 182–186, 202; 709/225, 709/229; 726/2–8
See application file for complete search history.

(56) References Cited

U.S. PATENT DOCUMENTS

| | | | |
|---|---|---|---|
| 7,739,744 B2 | 6/2010 | Burch et al. | |
| 7,788,703 B2 | 8/2010 | Jou et al. | |
| 7,979,899 B2 | 7/2011 | Guo et al. | |
| 8,260,262 B2 | 9/2012 | Ben Ayed | |
| 8,321,929 B2 | 11/2012 | Jaber et al. | |
| 2005/0021975 A1 | 1/2005 | Liu | |
| 2009/0264098 A1 | 10/2009 | Lo et al. | |
| 2009/0300744 A1* | 12/2009 | Guo | H04L 63/0823 726/7 |
| 2011/0223860 A1 | 9/2011 | Lo et al. | |
| 2011/0271331 A1* | 11/2011 | Adams | H04L 63/0853 726/6 |

* cited by examiner

*Primary Examiner* — Evans Desrosiers
(74) *Attorney, Agent, or Firm* — Winstead PC

(57) ABSTRACT

In one embodiment, a method includes receiving a request for wireless connection from a supplicant device via a service path. The service path includes a peer-to-peer communication path. The method further includes, based on an indication received from the supplicant device, adapting an authentication method to the supplicant device. The adapting includes selecting at least one authentication factor from a plurality of supported authentication factors. Each of the plurality of supported authentication factors comprises an authentication path that is distinct from the service path. In addition, the method includes authenticating the supplicant device via each of the at least one authentication factor.

20 Claims, 3 Drawing Sheets

SYSTEM AND METHOD FOR ADAPTIVE MULTIFACTOR AUTHENTICATION

BACKGROUND

Technical Field

The present invention relates generally to information security and more particularly, but not by way of limitation, to systems and methods for adaptive multifactor authentication.

History of Related Art

Many methods exist for establishing peer-to-peer (P2P) connections such as, for example, Wi-Fi direct connections. These methods usually focus on ways to convey connection information such as, for example, a Service Set Identifier (SSID) and a wireless password (e.g., a pre-shared key). Examples of such methods are traditional manual methods, pushbutton methods, as well as utilization of an out-of-band wireless channel such as, for example, Bluetooth. Existing methods, however, usually have well-known security vulnerabilities. In addition, there are not generally ways to allow, for example, an access-point owner, to vary a P2P-connection security policy. Therefore, improved methods of security for P2P communication are needed.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on an access-point (AP) device, receiving a request for wireless connection from a supplicant device via a service path. The service path includes a peer-to-peer communication path. The method further includes, based on an indication received from the supplicant device, adapting, by the AP device, an authentication method to the supplicant device. The adapting includes selecting at least one authentication factor from a plurality of supported authentication factors. Each of the plurality of supported authentication factors comprises an authentication path that is distinct from the service path. In addition, the method includes, on the AP device, authenticating the supplicant device via each of the at least one authentication factor.

In one embodiment, an information handling system includes a network interface operable to enable peer-to-peer connections thereto via a service path. The information handling system further includes a processing unit communicably coupled to the network interface. The processing unit is operable to receive a request for wireless connection from a supplicant device via the service path. In addition, the processing unit is operable to, based on an indication received from the supplicant device, adapt an authentication method to the supplicant device. The adaption comprises selection of at least one authentication factor from a plurality of supported authentication factors. Each of the plurality of supported authentication factors comprises an authentication path that is distinct from the service path. The processing unit is also operable to authenticate the supplicant device via each of the at least one authentication factor.

In one embodiment, a computer-program product includes a computer-usable medium having computer-readable program code embodied therein. The computer-readable program code is adapted to be executed to implement a method. The method includes receiving a request for wireless connection from a supplicant device via a service path. The service path includes a peer-to-peer communication path. The method further includes, based on an indication received from the supplicant device, adapting an authentication method to the supplicant device. The adapting includes selecting at least one authentication factor from a plurality of supported authentication factors. Each of the plurality of supported authentication factors comprises an authentication path that is distinct from the service path. In addition, the method includes authenticating the supplicant device via each of the at least one authentication factor.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
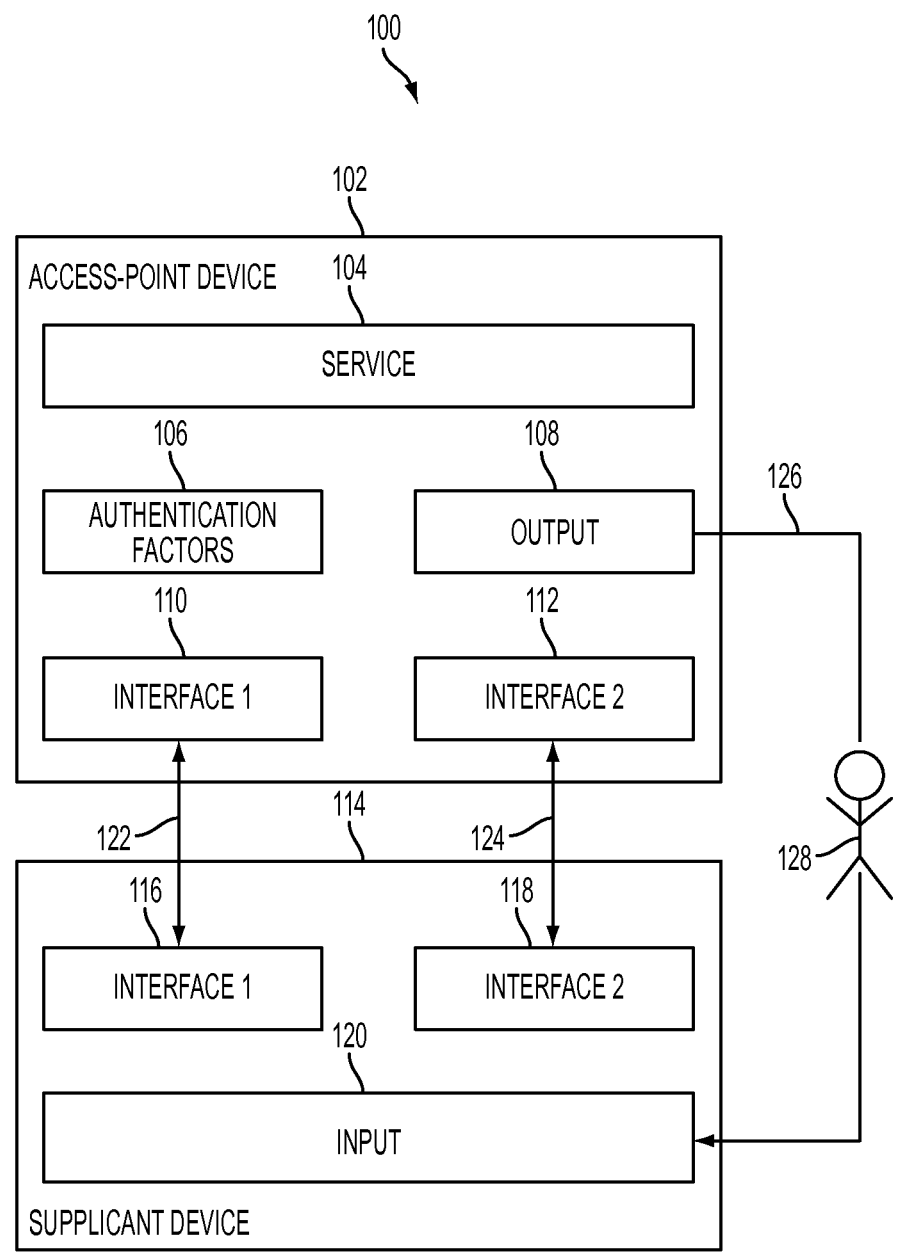
FIG. 1 illustrates a system for multifactor authentication.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or a video display. The information handling system may also include one or more buses operable to transmit communications between the various hardware components.

In various embodiments, an access-point (AP) device may provide a service to connected devices over a service path. The service path is typically a peer-to-peer communication path established via, for example, Wi-Fi direct. An AP device, as used herein, is an information handling system that allows other information handling systems to wirelessly connect to it using Wi-Fi or related standards. A service path, as used herein, is a network path over which an AP device provides a service to connected information handling systems. The service can be, for example, printing, screen projection, network access, or the like. In a typical embodiment, an AP device can have an adaptive security policy that varies an authentication method based on information received from a supplicant device. For purposes of this patent application, a supplicant device is an information handling system to be authenticated.

In a typical embodiment, an AP device authenticates supplicant devices and provides access to provided services according to a security policy. In a typical embodiment, the security policy supports a plurality of authentication factors. For purposes of this patent application, an authentication factor is a form of verifying a supplicant device. Multifactor authentication, as used herein, refers to a security policy that authenticates a supplicant device using more than one authentication factor. In a typical embodiment, authentication via an authentication factor utilizes an authentication path such as, for example, a network path. For purposes of this patent application, an authentication path is an out-of-band path such as, for example, a network path, that an AP device utilizes to provide authentication information such as, for example, a wireless pre-shared key or a shared secret, to a supplicant device. In a typical embodiment, a given supplicant device receives authentication information via an authentication path and returns the authentication information to an AP device via a service path for purposes of authentication.

FIG. 1 illustrates a system 100 for multifactor authentication. The system 100 includes an AP device 102 and a supplicant device 114 to be authenticated by the AP device 102. The AP device 102 can be, for example, a printer, projector, smart phone, or other information handling system. In similar fashion, the supplicant device 114 can be, for example, a smart phone, desktop computer, laptop computer, or other information handling system. As described in more detail below, the AP device 102 is operable to authenticate the supplicant device 114 prior to allowing the supplicant device access to a service 104 provided thereby.

In a typical embodiment, the service 104 is requested and provided over a service path 122. Requests to access the service 104 can take the form of a request for connection. In various embodiments, the service 104 can include printing, screen projection, network access, or the like. The service path 122 corresponds to a network path between a network interface 110 of the AP device 102 and a network interface 112 of the supplicant device 114. The network interface 110 and the network interface 116 can each be, for example, a Wi-Fi network interface operable to communicate via Wi-Fi and related standards. In particular, in a typical embodiment, the network interface 110 is a Wi-Fi direct network interface.

In typical embodiment, the AP device 102 further supports communication via a non-service path 124. The non-service path 124 corresponds to a network path between a network interface 112 of the AP device 102 and a network interface 118 of the supplicant device. The network interface 112 and the network interface 118 can each be, for example, a near-field communication (NFC) interface. In these embodiments, the non-service path 124 represents radio communication between the AP device 102 and the supplicant device 114 that is established, for example, by bringing the AP device 102 and the supplicant device 114 into close proximity (e.g., within a few centimeters).

In a typical embodiment, the AP device 102 further supports communication via a non-service path 126. As shown, the non-service path 126 is a non-network path that flows from an output 108 of the AP device 102 to a user 128 and, subsequently, to an input 120 of the supplicant device. The output 108 can be, for example, an audio or visual output that is audible or visible to the user 128. For example, the output 108 can be on a display or screen resident on the AP device 102. By way of further example, the output 108 can be manifested by a projected image (e.g., onto a wall). In addition, the output 108 can be an audio output that can be heard by the user 128. The input 120 can be, for example, a keyboard, mouse, touch screen, voice-recognition interface, or the like.

The AP device 102 supports authentication factors 106 that are utilized as governed by a security policy of the AP device 102. As described in greater detail below, the AP device 102 utilizes the authentication factors 106 to authenticate the supplicant device 114 before providing access to the service 104. In a typical embodiment, each authentication factor of the authentication factors 106 defines an authentication path that is used to perform authentication via that authentication factor. For example, in various embodiments, the authentication factors 106 can include a proximity-communication (PC) authentication factor and an interactive-presence-validation (IPV) authentication factor. Examples of the PC authentication factor and the IPV authentication factor will be described below.

For example, in various embodiments in which the non-service path 124 is communication via NFC, the PC authentication factor can utilize NFC. The PC authentication factor can utilize an access token that is provided by the AP device 102 to the supplicant device 114 over the non-service path 124. The access token typically includes an SSID, any wireless pre-shared key, and a shared secret such as, for example, a password, a passphrase, or an array of randomly chosen bytes. Subsequently, the shared secret can be provided by the supplicant device 114 back to the AP device 102 over the service path 122 so that the supplicant device 114 can be authenticated. In a typical embodiment, if the shared secret is successfully authenticated by the AP device 102, authentication via the PC authentication factor is deemed successful. In this manner, the PC authentication factor verifies that the supplicant device 114 is in close proximity to the AP device 102 per NFC standards. According to this example, the non-service path 124 may be considered an authentication path for the PC authentication factor.

In a typical embodiment, the IPV authentication factor utilizes the non-service path 126. IPV, as used herein, refers to interaction with a user such as, for example, the user 128, for purposes of verifying that the user 128 is in a vicinity of (e.g., a same room as) the AP device 102. For example, authentication via the IPV authentication factor can involve the AP device 102 outputting a personal identification number (PIN) or other secure code via the output 108. In a typical embodiment, the output 108 is viewable or audible, as appropriate, to the user 128. The supplicant device 114 is then operable to receive the PIN or other code from the user 128 via the input 120. Subsequently, the supplicant device 114 can provide the PIN or other secure code to the AP device 102 via the service path 122 for authentication. In that way, if the PIN or other code is successfully authenticated by the AP device 102, the user 126 and the supplicant device 114 can be deemed to be in the vicinity of the AP device 102, thereby resulting in the interactive presence validation being successful. According to this example, the non-service path 126 may be considered an authentication path for the IPV authentication factor.

In a typical embodiment, the IPV authentication factor described above can be further leveraged to perform PIN-based Wi-Fi protected setup. For example, the PIN output by the AP device 102 can be linked to a wireless pre-shared key for the AP Device. Therefore, the user 128 can input the PIN via the input 120. Since the PIN is linked to the wireless pre-shared key, in these embodiments, the user 128 can be deemed authenticated and need not separately provide the wireless pre-shared key.

In operation, the AP device 102 is operable to receive a request for wireless connection from the supplicant device 114 via the service path 122. Prior to providing access to the service 104, the AP device 102 performs an authentication method to authenticate the supplicant device 114. In a typical embodiment, the AP device 102 adapts the authentication method to the supplicant device 114. More particularly, the AP device 102 can select one or more of the authentication factors 106 for use in the authentication method based on an indication received from the supplicant device 114. In a typical embodiment, the indication results from information received with the request for wireless connection. For example, the request can indicate whether the supplicant device 114 has an access token that was obtained, for example, via the non-service path 124 as described above. By way of further example, the request can include a wireless pre-shared key for the AP device 102. Examples of how authentication factors can be selected and used will be described with respect to FIGS. 2-3.

Figure 2:
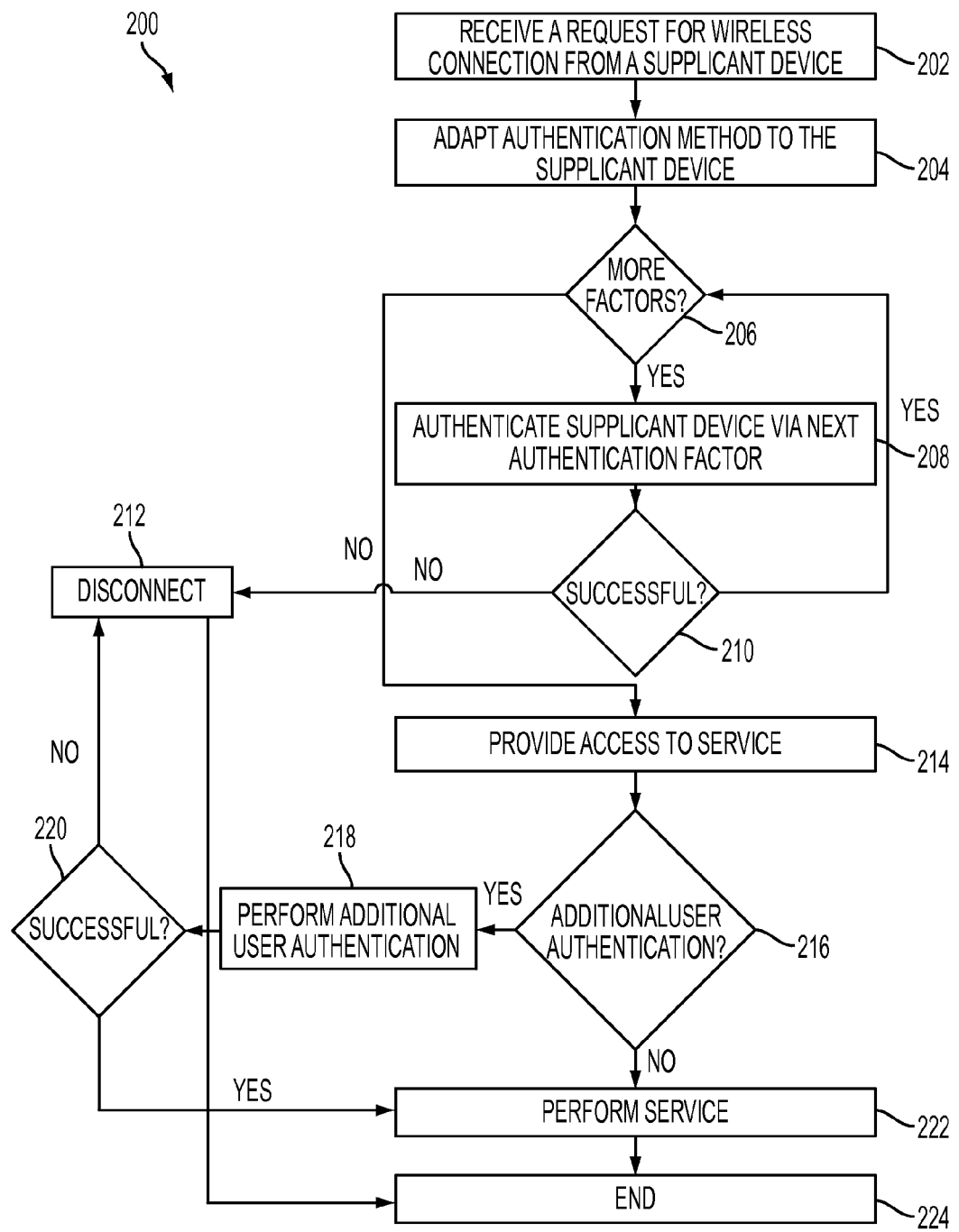
FIG. 2 illustrates a process that may be executed by an access-point device.

FIG. 2 illustrates a process 200 that may be executed by an AP device such as, for example, the AP device 102 of FIG. 1. In a typical embodiment, the process 200 is utilized to authenticate a supplicant device such as, for example, the supplicant device 114 of FIG. 1. The process 200 begins at step 202.

At step 202, the AP device receives a request for wireless connection from the supplicant device. In a typical embodiment, the request is received via a service path such as, for example, the service path 122 of FIG. 1. As described above with respect to FIG. 1, the request typically includes an indication from the supplicant device that is used to adapt an authentication method. The indication can be, for example, an indication of whether the supplicant device has an access token that was obtained, for example, via a non-service path as described with respect to FIG. 1. By way of further example, the indication can be a wireless pre-shared key for the AP device. From step 202, the process 200 proceeds to step 204.

At step 204, the AP device adapts the authentication method to the supplicant device based on the indication received from the supplicant device. In a typical embodiment, the AP device adapts the authentication method by selecting one or more authentication factors from a plurality of authentication factors that are supported by the AP device as determined, for example, by a security policy. From step 204, the process 200 proceeds to step 206.

At step 206, it is determined whether there are one or more additional authentication factors that need to be applied for purposes of authenticating the supplicant device. In a typical embodiment, the AP device applies the selected authentication factors (from step 204) sequentially until all authentication factors have been applied. If it is determined at step 206 that one or more authentication factors need to be applied, the process 200 proceeds to step 208. At step 208, the supplicant device is authenticated via a next authentication factor in the sequence. The authentication can include authentication via, for example, a PC authentication factor or an IPV authentication factor as described with respect to FIG. 1. From step 208, the process 200 proceeds to step 210.

At step 210, it is determined whether the authentication at step 208 was successful. If it is determined at step 210 that the authentication was not successful, the process 200 proceeds to step 212. At step 212, the AP device disconnects the supplicant device without providing access to the service. From step 212, the process 200 proceeds to step 224. At step 224, the process 200 ends. If it is determined at step 210 that the authentication was successful, the process 200 returns to step 206 for a determination of whether additional authentication factors need to be applied (as described above).

If it is determined at step 206 that no additional authentication factors need to be applied, the process 200 proceeds to step 214. At step 214, the supplicant device is granted access to the service provided by the AP device. From step 214, the process 200 proceeds to step 216. At step 216, it is determined whether additional user authentication is necessary prior to performing the service. If not, the process 200 proceeds to step 222. Step 222 will be described below. If it is determined at step 216 that additional user authentication is necessary, the process 200 proceeds to step 218. At step 218, the additional user authentication is performed. In various embodiments, the additional user authentication can include, for example, obtaining and verifying user credentials from a user's active directory. In various other embodiments, the additional user authentication can include, for example, prompting the user for a user name and password and verifying the user name and password. From step 218, the process 200 proceeds to step 220.

At step 220, it is determined whether the additional user authentication was successful. If not, the process 200 proceeds to step 212, where the AP device disconnects the supplicant device as described above. It should appreciated that, in various embodiments, different failure conditions that do not result in disconnection can be defined. In some embodiments, it may be that the user is not permitted to perform the service as requested. For example, the security policy may specify that only certain users or classes of users are permitted, for example, to print on glossy paper. Therefore, in these embodiments, rather than be disconnected, the user may be presented with an appropriate explanatory message. If it is determined at step 220 that the additional user authentication was successful, the process 200 proceeds to step 222. At step 222, the service is performed. From step 222, the process 200 proceeds to step 224. At step 224, the process 200 ends.

Figure 3:
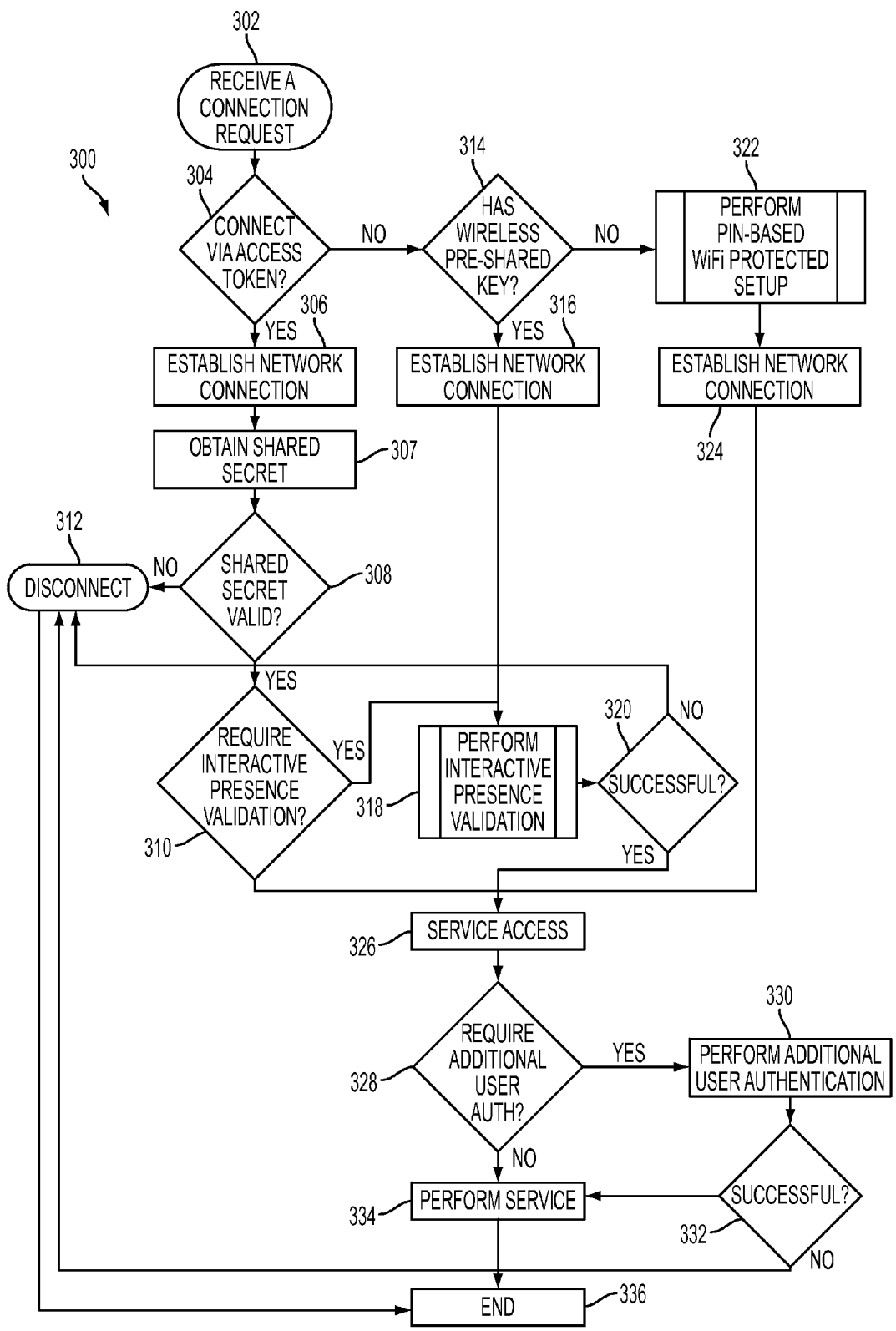
FIG. 3 illustrates a process that may be executed by an AP device.

FIG. 3 illustrates a process 300 that may be executed by an AP device such as, for example, the AP device 102 of FIG. 1. In a typical embodiment, the process 300 is utilized to authenticate a supplicant device such as, for example, the supplicant device 114 of FIG. 1. In a typical embodiment, the process 300 is illustrative of a security policy that can be implemented by the AP device. The process 300 begins at step 302.

At step 302, a request for wireless connection is received. In a typical embodiment, the request is received via a service path such as, for example, the service path 122 of FIG. 1. As described above with respect to FIGS. 1-2, the request typically includes an indication from the supplicant device that is used to adapt the authentication method. The indication can be, for example, an indication of whether the supplicant device has an access token that was obtained, for example, via a non-service path. By way of further example, the indication can be a wireless pre-shared key for the AP device. As described in greater detail below, the process 300 illustrates four distinct authentication factors that can be combined in various fashions to constitute the adapted authentication method. Specifically, steps 308, 314, 318, and 322 are each examples of applying authentication factors as part of the adapted authentication method. From step 302, the process 300 proceeds to step 304.

At step 304, it is determined whether the supplicant device has an access token. In a typical embodiment, any such access token includes a shared secret. If it is determined at step 304 that the supplicant device has an access token, the process 300 proceeds to step 306. At step 306, the AP device establishes a network connection with the supplicant device over the service path. From step 306, the process 300 proceeds to step 307. At step 307, the AP device obtains the access token's shared secret from the supplicant device. From step 307, the process 300 proceeds to step 308. At step 308, it is determined whether the shared secret is valid. If not, the process 300 proceeds to step 312. At step 312, the AP device disconnects the supplicant device. From step 312, the process 300 proceeds to step 336. At step 336, the process 300 ends.

If it is determined at step 308 that the shared secret is valid, the process 300 proceeds to step 310. At step 310, it is determined whether IPV is required according to the security policy. If it is determined at step 310 that IPV is not required, the process 300 proceeds to step 326. At step 326, the supplicant device is provided service access. From step 326, the process 300 proceeds to step 328. At step 328, it is determined whether additional user authentication is necessary prior to performing the service. If not, the process 300 proceeds to step 334. Step 334 will be described below. If it is determined at step 328 that additional user authentication is necessary, the process 300 proceeds to step 330. At step 330, the additional user authentication is performed. In various embodiments, the additional user authentication can include, for example, obtaining and verifying user credentials from a user's active directory. In various other embodiments, the additional user authentication can include, for example, prompting the user for a user name and password and verifying the user name and password. From step 330, the process 300 proceeds to step 332.

At step 332, it is determined whether the additional user authentication was successful. If not, the process 300 proceeds to step 312, where the AP device disconnects the supplicant device. It should appreciated that, in various embodiments, different failure conditions that do not result in disconnection can be defined. As described with respect to FIG. 2, in some embodiments, it may be that the user is not permitted to perform the service as requested. For example, the security policy may specify that only certain users or classes of users are permitted to perform the service as requested. Therefore, in these embodiments, rather than be disconnected, the user may be presented with an appropriate explanatory message. If it is determined at step 332 that the additional user authentication was successful, the process 300 proceeds to step 334. At step 334, the service is performed. From step 334, the process 300 proceeds to step 336. At step 336, the process 300 ends.

If it is determined it is determined at step 310 that IPV is required, the process 300 proceeds to step 318. At step 318, IPV is performed as described with respect to FIG. 1. From step 318, the process 300 proceeds to step 320. At step 320, it is determined whether the IPV was successful. If it is determined at step 320 that the IPV was not successful, the process 300 proceeds to step 312 and disconnects as described above. However, if it is determined at step 320 that the IPV was successful, the process 300 proceeds to step 326 and executes as described above.

Returning to step 304, if it is determined that the supplicant device does not have an access token, the process 300 proceeds to step 314. At step 314, it is determined whether the supplicant device possesses a wireless pre-shared key for the AP device. In a typical embodiment, any such wireless pre-shared key can be included as part of the request received at step 302. If it is determined at step 304 that the supplicant device has a wireless pre-shared key for the AP device, the process 300 proceeds to step 316. At step 316, the AP device establishes a network connection with the supplicant device over the service path. From step 316, the process 300 proceeds to step 318 and executes as described above.

If it is determined at step 314 that the supplicant device does not have a wireless pre-shared key for the AP device, the process 300 proceeds to step 322. At step 322, PIN-based Wi-Fi protected setup is performed. In a typical embodiment, the PIN-based Wi-Fi protected set is performed as described with respect to FIG. 1. From step 322, the process 300 proceeds to step 324. At step 324, the AP device establishes a network connection with the supplicant device over the service path. From step 324, the process 300 proceeds to step 326 and executes as described above.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    on an access-point (AP) device, receiving a request for wireless connection from a supplicant device via a service path, the service path comprising a peer-to-peer communication path;
    based on an indication received from the supplicant device, adapting, by the AP device, an authentication method to the supplicant device;
    wherein the adapting comprises selecting at least one authentication factor from a plurality of supported authentication factors;
    wherein each of the plurality of supported authentication factors comprises an authentication path that is distinct from the service path; and
    on the AP device, authenticating the supplicant device via each of the at least one authentication factor.

2. The method of claim 1, comprising, responsive to the authenticating resulting in success, granting the supplicant device access to a service over the service path.

3. The method of claim 2, comprising performing additional user authentication prior to performing the service.

4. The method of claim 1, comprising:
    wherein the at least one authentication factor comprises a proximity-communication factor;

wherein the indication comprises an indication that the supplicant device has an access token, the access token comprising a shared secret;

wherein the selecting comprises selecting the proximity-communication factor; and wherein the authenticating comprises authenticating the supplicant device via the proximity-communication factor.

5. The method of claim 4, wherein authenticating the supplicant device via the proximity-communication factor comprises:

establishing a connection with the supplicant device;

receiving the shared secret; and validating the shared secret.

6. The method of claim 5, wherein the supplicant device has obtained the access token from the AP device via near-field communication (NFC).

7. The method of claim 1, comprising:

wherein the at least one authentication factor comprises an interactive-presence-validation (IPV) factor; and wherein the authenticating comprises performing IPV.

8. The method of claim 1, wherein the service path comprises a network path between a Wi-Fi direct interface of the AP device and a Wi-Fi interface of the supplicant device.

9. The method of claim 1, wherein the at least one authentication factor comprises a plurality of authentication factors.

10. The method of claim 1, wherein the at least one authentication factor comprises an interactive-presence-validation (IPV) factor and a proximity-communication factor.

11. An information handling system comprising:

a network interface operable to enable peer-to-peer connections thereto via a service path;

a processing unit communicably coupled to the network interface, wherein the processing unit is operable to:

receive a request for wireless connection from a supplicant device via the service path;

based on an indication received from the supplicant device, adapt an authentication method to the supplicant device;

wherein the adaption comprises selection of at least one authentication factor from a plurality of supported authentication factors;

wherein each of the plurality of supported authentication factors comprises an authentication path that is distinct from the service path; and authenticate the supplicant device via each of the at least one authentication factor.

12. The information handling system of claim 11, wherein the processing unit is operable, responsive to the authenticating resulting in success, to grant the supplicant device access to a service over the service path.

13. The information handling system of claim 12, wherein the processing unit is operable to perform additional user authentication prior to performing the service.

14. The information handling system of claim 11, comprising:

wherein the at least one authentication factor comprises a proximity-communication factor;

wherein the indication comprises an indication that the supplicant device has an access token, the access token comprising a shared secret;

wherein the selection comprises selection of the proximity-communication factor; and wherein the authentication comprises authentication of the supplicant device via the proximity-communication factor.

15. The information handling system of claim 14, wherein authentication of the supplicant device via the proximity-communication factor comprises:

establishment of a connection with the supplicant device;

receipt of the shared secret; and validation of the shared secret.

16. The information handling system of claim 15, comprising:

a near-field communication (NFC) network interface; and wherein the information handling system has transmitted the access token to the AP device via the NFC network interface.

17. The information handling system of claim 11, comprising:

wherein the at least one authentication factor comprises an interactive-presence-validation (IPV) factor; and wherein the authentication comprises performance of IPV.

18. The information handling system of claim 11, wherein the service path comprises a network path between a Wi-Fi direct interface of the AP device and a Wi-Fi interface of the supplicant device.

19. The information handling system of claim 11, wherein the at least one authentication factor comprises a plurality of authentication factors.

20. A computer-program product comprising a non-transitory computer-usable medium having computer-readable program code embodied therein, the computer-readable program code adapted to be executed to implement a method comprising:

receiving a request for wireless connection from a supplicant device via a service path, the service path comprising a peer-to-peer communication path;

based on an indication received from the supplicant device, adapting an authentication method to the supplicant device;

wherein the adapting comprises selecting at least one authentication factor from a plurality of supported authentication factors;

wherein each of the plurality of supported authentication factors comprises an authentication path that is distinct from the service path; and authenticating the supplicant device via each of the at least one authentication factor.

* * * * *